(12) United States Patent
Suzuki et al.

(10) Patent No.: US 10,483,016 B2
(45) Date of Patent: Nov. 19, 2019

(54) CABLE, ELECTRIC POWER STEERING DEVICE USING THE CABLE, AND METHOD OF MANUFACTURING THE CABLE

(71) Applicant: DENSO CORPORATION, Kariya, Aichi-pref. (JP)

(72) Inventors: Toshiro Suzuki, Kariya (JP); Takeshi Konishi, Kariya (JP); Shigetoshi Fukaya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 245 days.

(21) Appl. No.: 15/704,547

(22) Filed: Sep. 14, 2017

(65) Prior Publication Data
US 2018/0082766 A1     Mar. 22, 2018

(30) Foreign Application Priority Data
Sep. 16, 2016   (JP) .................................. 2016-181251

(51) Int. Cl.
| | |
|---|---|
| *H01B 7/29* | (2006.01) |
| *B60R 16/02* | (2006.01) |
| *B62D 5/04* | (2006.01) |
| *H01B 7/02* | (2006.01) |
| *H01B 13/00* | (2006.01) |
| *H02G 1/12* | (2006.01) |
| *H02G 15/18* | (2006.01) |

(52) U.S. Cl.
CPC ......... *H01B 7/292* (2013.01); *B60R 16/0207* (2013.01); *B60R 16/0215* (2013.01); *B62D 5/046* (2013.01); *H01B 7/02* (2013.01); *H01B 13/0016* (2013.01); *H02G 1/12* (2013.01); *H02G 15/1806* (2013.01)

(58) Field of Classification Search
CPC ...... H01B 7/292; H01B 13/0016; H01B 7/02; B60R 16/0207; B60R 16/0215; B62D 5/046; H02G 1/12; H02G 15/1806
USPC ....................................... 174/113 R
See application file for complete search history.

(56) References Cited

U.S. PATENT DOCUMENTS

| | | | |
|---|---|---|---|
| 6,395,977 B1 * | 5/2002 | Yamamoto | H01R 24/44 174/36 |
| 2013/0229097 A1 * | 9/2013 | Tamai | H05K 5/0247 312/223.6 |
| 2015/0075862 A1 * | 3/2015 | Oka | H01R 4/20 174/72 A |

(Continued)

FOREIGN PATENT DOCUMENTS

| | | |
|---|---|---|
| JP | 2000-188024 | 7/2000 |
| JP | 2010-027427 | 2/2010 |
| JP | 2016-12966 A | 1/2016 |

*Primary Examiner* — Sherman Ng
(74) *Attorney, Agent, or Firm* — Knobbe, Martens, Olson & Bear, LLP

(57) ABSTRACT

A conductive wire has a peripheral disposition part disposed around a center member and an extension part integrally formed with the peripheral disposition part so as to extend from the peripheral disposition part. A plurality of conductive wires are disposed. A sheath is disposed so as to cover the center member and the peripheral disposition part. A tube is disposed so as to surround an end portion of the sheath and a part of the extension part, and is thermally shrinkable. An adhesive is disposed inside the tube and is melted or softened by heat.

14 Claims, 14 Drawing Sheets

(56) References Cited

U.S. PATENT DOCUMENTS

| | | | |
|---|---|---|---|
| 2015/0122544 A1* | 5/2015 | Shiba | H01R 4/70 174/72 A |
| 2016/0066483 A1* | 3/2016 | Fukuda | B60R 16/0215 174/68.3 |
| 2016/0189828 A1* | 6/2016 | Oga | B60R 16/0215 174/72 A |

* cited by examiner

CABLE, ELECTRIC POWER STEERING DEVICE USING THE CABLE, AND METHOD OF MANUFACTURING THE CABLE

CROSS-REFERENCE TO RELATED APPLICATION

This application is based on and claims the benefit of priority from earlier Japanese Patent Application No. 2016-181251 filed Sep. 16, 2016, the description of which is incorporated herein by reference.

TECHNICAL FIELD

The present disclosure relates to a cable, an electric power steering device using the cable, and a method of manufacturing the cable.

BACKGROUND

Conventionally, a cable having a tube surrounding a plurality of conductive wires exposed from an end portion of a sheath is known.

For example, Patent Document 1 (Japanese Patent Application Laid-Open Publication No. 2016-12966) discloses that an adhesive is placed inside a heat-shrinkable tube, and the tube is heated and pressurized radially inward when manufacturing a cable.

When the tube is heated and pressurized, the tube shrinks and the adhesive is filled in spaces between a plurality of conductive wires, thereby the adhesive and an inner wall of the tube, and outer walls of the conductive wires and an end of the sheath are brought into tight contact.

As a result, water or the like is suppressed from entering into an inside of the sheath via gaps between the adhesive and the tube, and the conductive wires and the sheath.

As described above, the tube is heated and pressurized radially inward during the manufacturing in the cable of Patent Document 1. Therefore, there is a possibility that the plurality of conductive wires are urged toward to a specific position inside the tube.

Thereby, there is a possibility that inter-line gaps of the plurality of conductive wires become non-uniform, and the filling of the adhesive into the gaps between the wires becomes insufficient. As a result, the water resistance at the end of the cable may decrease.

Further, since it is necessary to press the tube radially inward during manufacturing, a device for pressurizing or the like is required, and the manufacturing cost may increase in the cable of Patent Document 1.

SUMMARY

An embodiment provides a cable with high water resistance at an end thereof, an electric power steering device using the cable, and a method of manufacturing the cable.

An aspect of a cable includes a center member, a plurality of conductive wires each of which has a perimeter disposition part disposed around the center member and an extension part integrally formed with the perimeter disposition part so as to extend from the perimeter disposition part, a sheath that covers the center member and the perimeter disposition part, a thermally shrinkable tube that surrounds an end portion of the sheath and a part of the extension part, and an adhesive melted or softened by heat disposed inside the tube.

The perimeter disposition parts of the conductive wires are disposed around the center member in the present disclosure.

Therefore, the extension parts extending from the perimeter disposition parts are suppressed from being urged toward to specific locations inside the tube during manufacturing the cable such as when the tube is shrinking. Thereby, gaps between of the plurality of extension parts 301 become uniform.

Therefore, the adhesive is sufficiently filled in the gaps between the extension parts of the conductive wires inside the tube. Therefore, the water resistance at the end portions of the cable can be improved.

Further, it is unnecessary to press the tube radially inwardly as in the above-mentioned prior art when manufacturing the cable in the present disclosure. Therefore, it is unnecessary to provide a device or the like for pressurizing, and the manufacturing cost can be reduced.

DETAILED DESCRIPTION OF THE PREFERRED EMBODIMENT

Figure 1A:
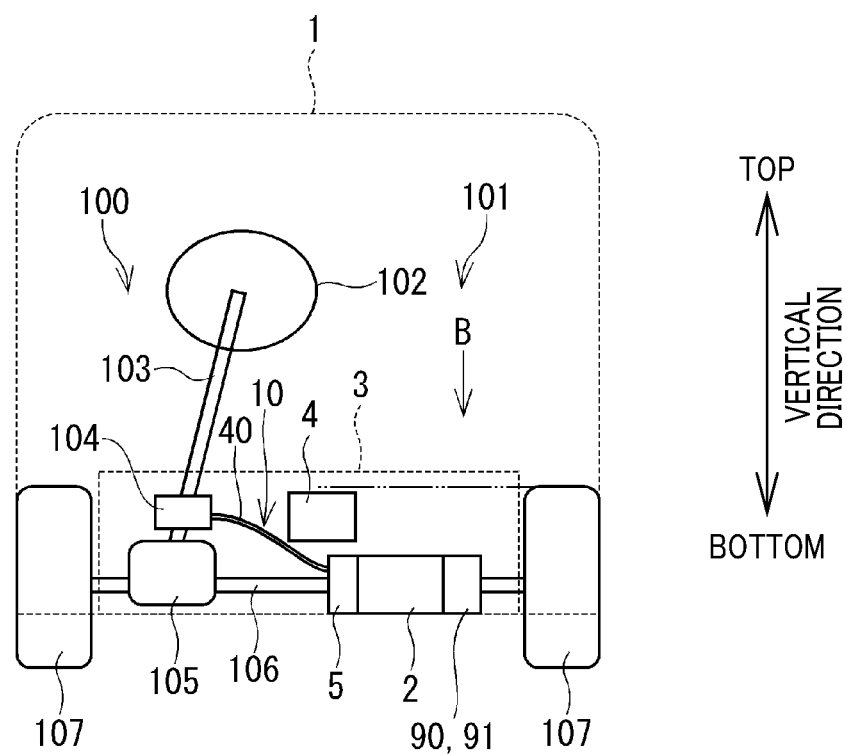
FIG. 1A shows a schematic view of a state in which a cable according to a first embodiment is applied to an electric power steering device.

Hereinafter, a cable and an electric power steering device using the same according to a plurality of embodiments of the present disclosure will be described with reference to the drawings.

It should be appreciated that, in the subsequent embodiments, components identical with or similar to those in a first embodiment are given the same reference numerals, unless otherwise indicated, and repeated structures and features thereof will not be described in order to avoid redundant explanation.

First Embodiment

Figure 2A:
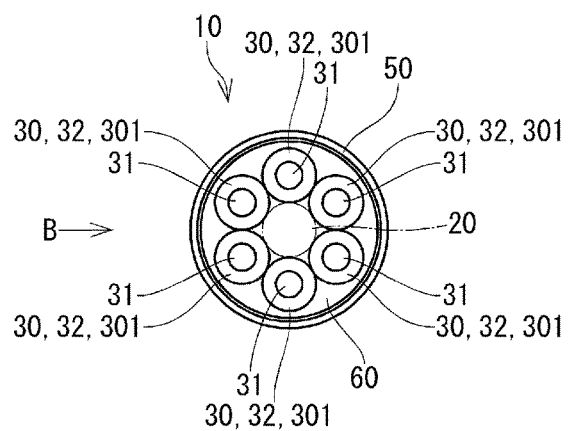
FIG. 2A shows a front view of the cable according to the first embodiment.
Figure 2B:
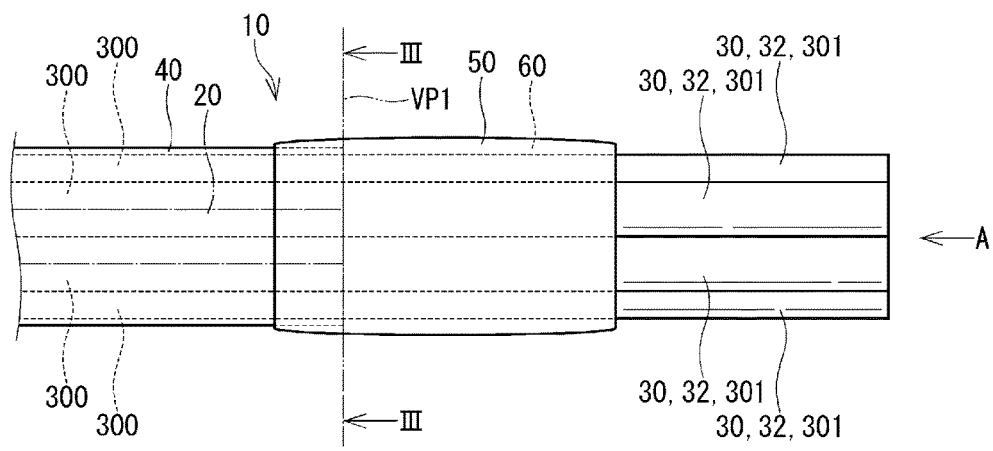
FIG. 2B shows a schematic view of FIG. 2A viewed from a direction of an arrow B.
Figure 2C:
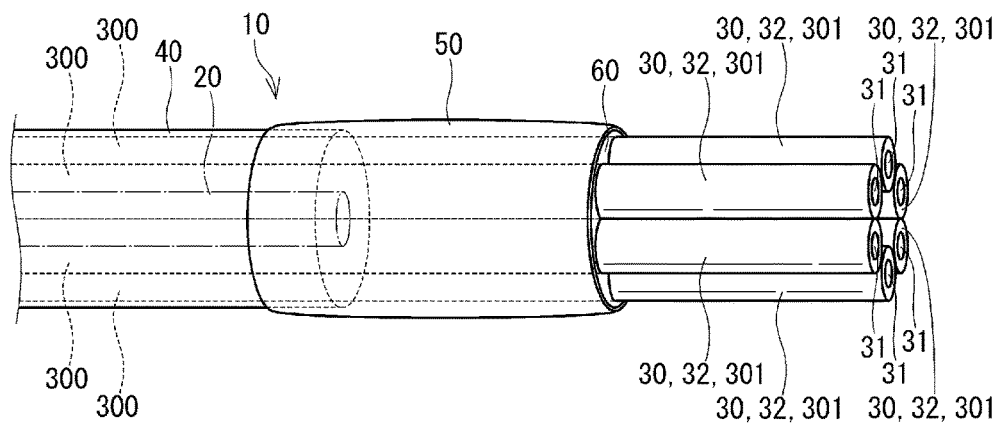
FIG. 2C shows a perspective view of the cable.

A cable according to a first embodiment of the present disclosure is shown in FIGS. 2A to 2C. A cable 10 is adopted in an electric power steering device for assisting a steering operation of a vehicle, for example.

FIG. 1A shows an overall configuration of a steering system 100 including an electric power steering device 101.

The electric power steering device 101 includes a torque sensor 104 disposed on a steering shaft 103 connected to a steering wheel 102.

The torque sensor 104 detects a steering torque inputted to the steering shaft 103 from a driver of a vehicle 1 via the steering wheel 102.

A pinion gear 105 is disposed at a distal end of the steering shaft 103, and the pinion gear 105 meshes with a rack shaft 106.

A pair of wheels 107 are rotatably connected to both ends of the rack shaft 106 via tie rods or the like (not shown).

Thereby, the steering shaft 103 connected to the steering wheel 102 rotates when the driver rotates the steering wheel 102.

A rotational motion of the steering shaft 103 is converted into a linear motion of the rack shaft 106 by the pinion gear 105, and the pair of wheels 107 are steered with respect to an angle corresponding to the linear motion displacement of the rack shaft 106.

The electric power steering device 101 includes a motor 2 for generating an assist torque relating to the steering of the vehicle 1, a control unit 5 for controlling operation of the motor 2, a rack gear 90 for decelerating the rotation of the motor 2 and transmitting the rotation to the rack shaft 106, etc.

The motor 2 is attached to a housing 91 of the rack gear 90 in the present embodiment.

The motor 2 is disposed in an engine compartment 3 of the vehicle 1, for example. The motor 2 is a three-phase drive type brushless motor, for example, and is driven by being supplied with electric power from a battery 4. The motor 2 rotates the rack gear 90 forward and reverse.

The electric power steering device 101 includes the above-described torque sensor 104 and a vehicle speed sensor for detecting a vehicle speed.

The control unit 5 controls the operation of the motor 2 based on signals from the torque sensor 104, the vehicle speed sensor, and the like.

With this configuration, the electric power steering device 101 generates an assist torque from the motor 2 to assist the steering of the steering wheel 102 based on the signals from the torque sensor 104, the vehicle speed sensor, and the like, and transmits the assist torque via the rack gear 90 to the rack shaft 106.

As described above, the electric power steering device 101 is a rack assist type electric power steering device in the present embodiment.

The control unit 5 is disposed integrally with the motor 2 in the present embodiment. That is, the motor 2 is a machine/electricity integral type motor.

The cable 10 according to the present embodiment is used for connecting the torque sensor 104 and the control unit 5.

A signal from the torque sensor 104 is transmitted to the control unit 5 via the cable 10.

As shown in FIGS. 2A to 2C, the cable 10 includes a center member 20, a conductive wire 30, a sheath 40, a first adhesive 60, a tube 50, and the like.

The center member 20 is formed in a long cylindrical shape by a resin having a relatively high heat resistance such as a polyethylene based resin.

The center member 20 has predetermined heat resistance and flexibility. A plurality of conductive wires 30 are disposed around the center member 20 in a radial direction. Six conductive wires 30 are disposed in the present embodiment.

The conductive wire 30 has an electric conductive member 31 and an insulating member 32.

The electric conductive member 31 is formed into a long cylindrical shape by a conductor such as a metal, for example.

The insulating member 32 is formed of an insulator having a relatively high heat resistance such as a crosslinked polyethylene type resin, for example, and covers a periphery of the electric conductive member 31.

An outer diameter of the conductive wire 30, that is, an outer diameter of the insulating member 32 is the same as an outer diameter of the center member 20 in the present embodiment.

The conductive wire 30 has a perimeter disposition part 300 and an extension part 301 as regional components.

The perimeter disposition part 300 is disposed around the center member 20. More specifically, six perimeter disposition parts 300 are disposed at equal intervals around the center member 20.

Figure 3:
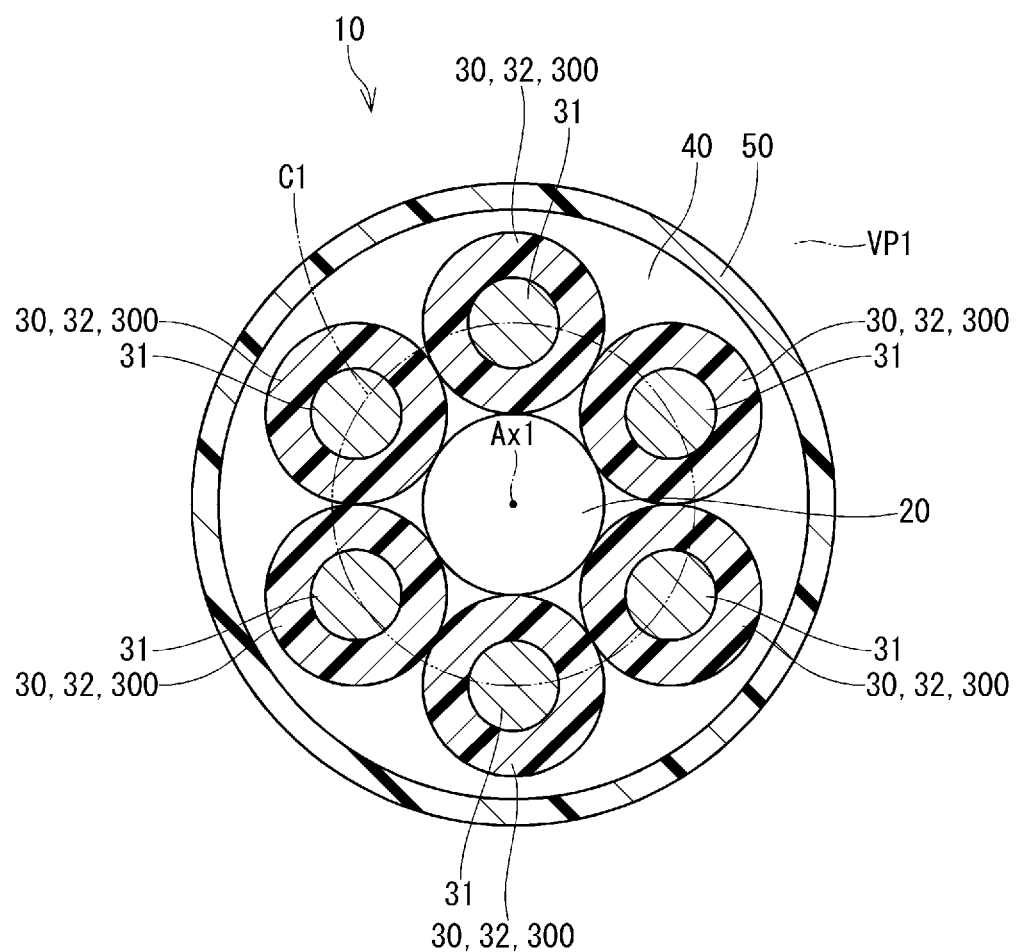
FIG. 3 shows a sectional view taken along a line III-III of FIG. 2B.

Since an outer diameter of the perimeter disposition part 300 is the same as the outer diameter of the center member 20, an outer peripheral wall of each of the six perimeter disposition parts 300 is in contact with outer peripheral walls of the adjoining perimeter disposition part 300 and the center member 20 in the present embodiment (refer to FIG. 3).

In addition, the six perimeter disposition parts 300 are disposed on a virtual circle C1 centered on a center axis Ax1 of the center member 20.

More specifically, the perimeter disposition part 300 is disposed such that a center thereof is located on the imaginary circle C1 (refer to FIG. 3).

The extension part 301 is integrally formed with the perimeter disposition part 300 so as to extend in an axial direction from an end portion of the perimeter disposition part 300.

That is, a portion of the conductive wire 30 located around the center member 20 corresponds to the perimeter disposition part 300, and a portion of the conductive wire 30 located on an opposite side to the perimeter disposition part 300 with respect to a virtual plane VP1 including an end surface of the center member 20 corresponds to the extension part 301 (refer to FIG. 2B).

The sheath 40 is formed in a long cylindrical shape by a resin having a relatively high heat resistance such as a crosslinked polyurethane resin.

The sheath 40 is disposed so as to cover the center member 20 and the perimeter disposition parts 300 of the conductive wires 30.

That is, the perimeter disposition parts 300 of the conductive wires 30 and the center member 20 are disposed inside the sheath 40.

The sheath 40 is present in gaps between the plurality of perimeter disposition parts 300 and the center member 20 (refer to FIG. 3).

The tube 50 is formed in a substantially cylindrical shape by a resin having a heat-shrinking property such as a crosslinked polyolefin resin, a fluorine polymer, or a thermoplastic elastomer. The tube 50 shrinks when it is heated to a predetermined temperature or higher.

The tube 50 is disposed so as to cover an end portion of the sheath 40 and a part of the extension part 301.

More specifically, the tube 50 is disposed so as to cover the end portion of the sheath 40 and a portion of the extension part 301 on a perimeter disposition part 300 side (refer to FIGS. 2A to 2C).

The first adhesive 60 is formed of a thermomeltable or thermoplastic resin such as a polyolefin resin, for example.

The first adhesive 60 is solid at room temperature and melts when heated to a predetermined temperature or higher.

When the melted first adhesive 60 cools and solidifies, surrounding members and the like may be bonded.

The first adhesive 60 is disposed inside the tube 50 in the present embodiment.

More specifically, the first adhesive 60 is disposed so as to be filled inside the tube 50.

Here, the first adhesive 60 and an inner wall of the tube 50, outer peripheral walls of the extension parts 301 of the conductive wires 30 and an end surface of the sheath 40 are in close contact.

Next, characteristics relating to the temperature of each member will be described.

When defining that the melting point of the first adhesive 60 is Tm1, the melting point of the center member 20 is Tm2, the melting point of the sheath 40 is Tm3, the melting point of the insulating member 32 is Tm4, the shrinkage temperature which is the temperature at which the tube 50 starts to shrink is Ts, and the usage environment of the cable 10, that is, the assumed maximum temperature of the engine compartment 3 is Tmax, the first adhesive 60, the center member 20, the sheath 40, the insulating member 32, and the tube 50 are made of materials satisfying the following relationship.

[Tmax<Tm1<Ts<Tm2, Tm3, Tm4]

Here, the magnitude relation between Tm2, Tm3, and Tm4 may be anything as long as Tm2, Tm3, and Tm4 are higher than Ts.

That is, the center member 20 has a higher melting point than that of the first adhesive 60.

In addition, the insulating member 32 has a higher melting point than that of the first adhesive 60.

Moreover, the shrinkage temperature Ts is higher than the melting point of the first adhesive 60 and is lower than the melting point of the center member 20.

The cable 10 is disposed with extension parts 301, the tube 50, and the first adhesive 60 at both ends in the present embodiment. That is, the configuration of both ends of the cable 10 is as shown in FIGS. 2A to 2C.

Figure 1B:
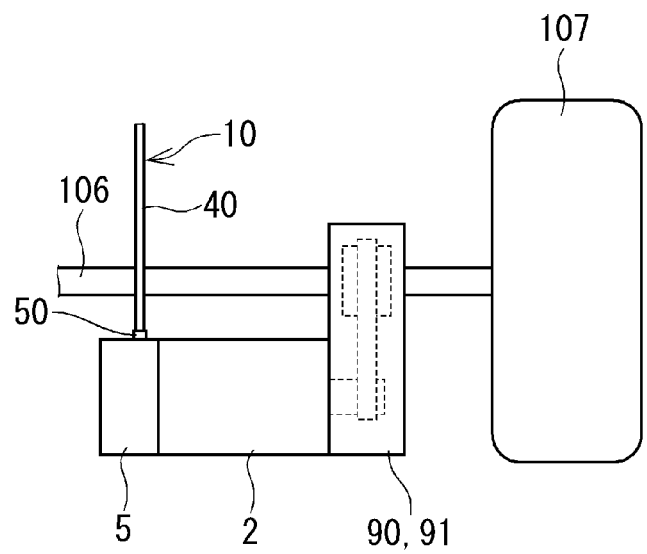
FIG. 1B shows a schematic view of FIG. 1A viewed from a direction of an arrow B.

One end of the cable 10 is connected to the control unit 5 (refer to FIG. 1B).

Then, the electric conductive member 31 of the extension part 301 is electrically connected to a substrate (not shown) of the control unit 5.

Another end of the cable 10 is connected to the torque sensor 104 (refer to FIG. 1A).

Then, the electric conductive member 31 of the extension part 301 is electrically connected to a detecting section of the torque sensor 104.

As a result, the signal from the torque sensor 104 is transmitted to the control unit 5 via the cable 10.

The motor 2, the control unit 5, and the torque sensor 104 are disposed below an upper end part in the vertical direction of a silhouette of the wheel 107 of the vehicle 1 as shown in FIG. 1A in the present embodiment.

Therefore, the motor 2, the control unit 5, the torque sensor 104 and ends of the cable 10 may be frequently wetted by muddy water or salt water (snow-melting salt water of snowy area or salt water adhered to sand, etc. of coastal line) while the vehicle 1 is travelling.

It should be noted that, as described above, the usage environment of the cable 10, that is, the assumed maximum temperature of the engine compartment 3 is Tmax in the present embodiment.

Next, a method of manufacturing the cable 10 of the present embodiment will be described.

The method of manufacturing the cable 10 includes the following steps.

[Sheath Removing Step]

An unprocessed cable 11 to be processed in a sheath removing step has the center member 20 located also at the ends of the plurality of conductive wires 30, that is, the inside of the extension parts 301, and the extension parts 301 and the center member 20 inside the extension parts 301 are also covered with the sheath 40.

Of the sheath 40 covering the plurality of conductive wires 30 of the unprocessed cable 11, a portion corresponding to the extension parts 301 is removed (refer to FIGS. 4A to 4C) in the sheath removing step.

[Center Member Removing Step]

After the sheath removing step, a portion of the center member 20 corresponding to the extension parts 301 is removed in a center member removing step.

Figure 4A:
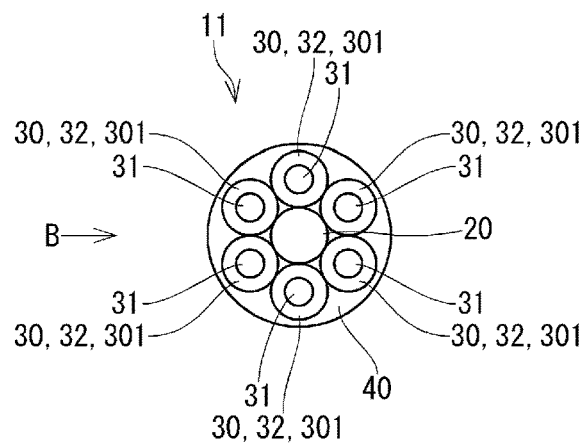
FIG. 4A shows a front view of the cable in a sheath removing step and a center member removing step of a method of manufacturing the cable according to the first embodiment.
Figure 4B:
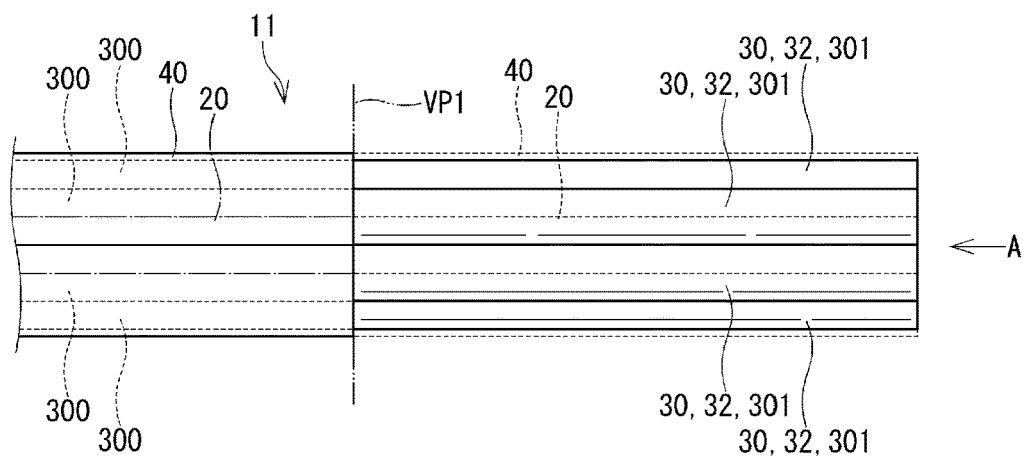
FIG. 4B shows a side view of the cable in the sheath removing step and the center member removing step of the method of manufacturing the cable according to the first embodiment as viewed from a direction of an arrow B in FIG. 4A.
Figure 4C:
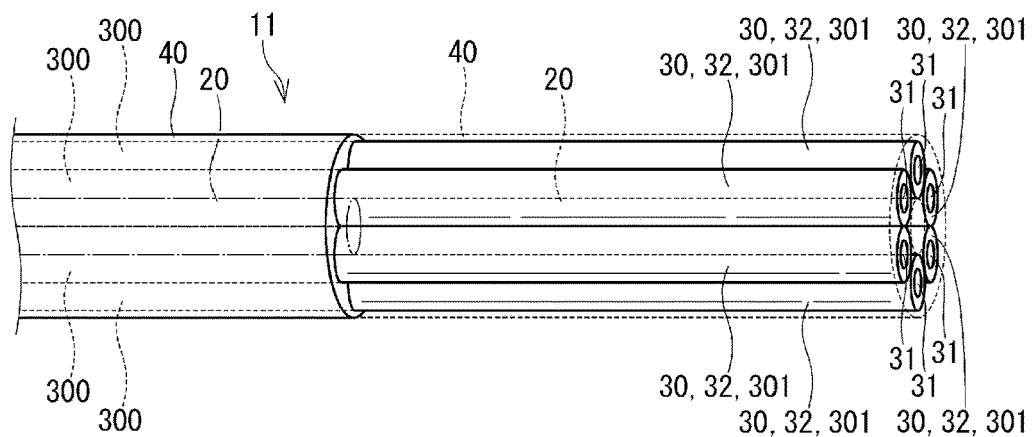
FIG. 4C is a perspective view of the cable in the sheath removing step and the center member removing step of the method of manufacturing the cable according to the first embodiment.

Thereby, the end surface of the sheath 40 and the end surface of the center member 20 are positioned on substantially the same plane (the virtual plane VP1) (refer to FIGS. 4A to 4C).

[Adhesive Disposing Step]

After the center member removing step, a substantially cylindrical second adhesive 61 is disposed around three out of the six extension parts 301 in an adhesive disposing step.

Figure 5A:
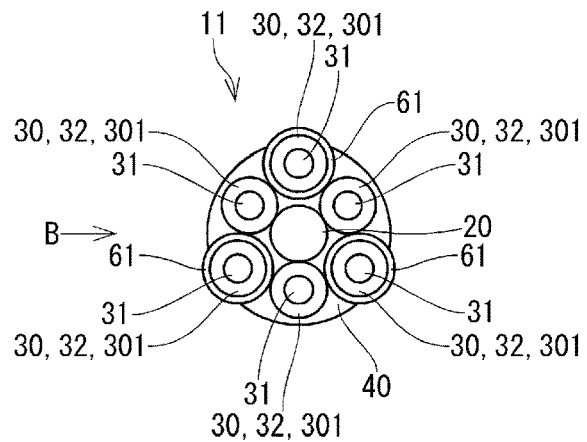
FIG. 5A shows a front view of a cable in an adhesive disposing step according to the method of manufacturing the cable according to the first embodiment.
Figure 5B:
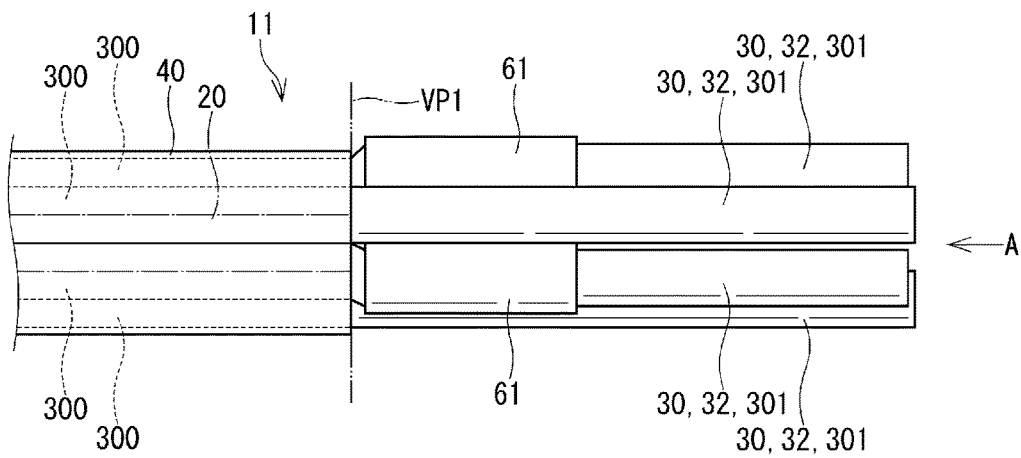
FIG. 5B shows a side view of a cable in an adhesive disposing step of a method of manufacturing a cable according to the first embodiment in FIG. 5A as viewed from the direction of an arrow B.
Figure 5C:
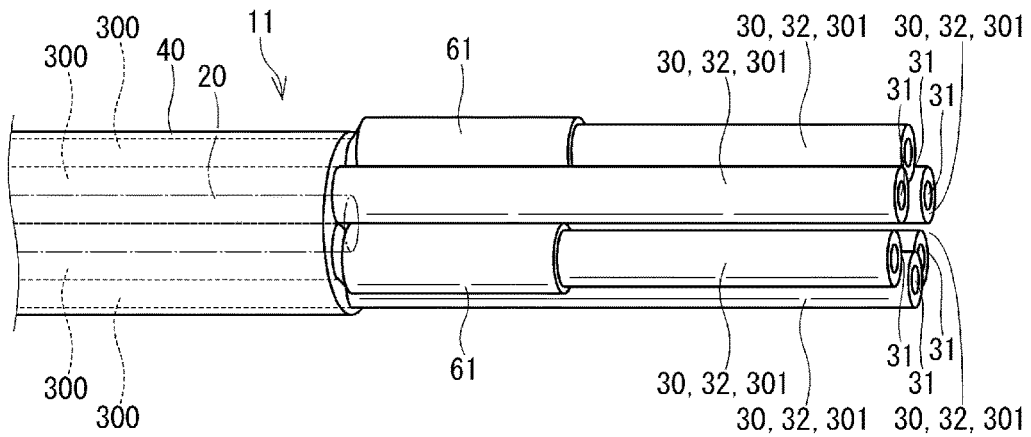
FIG. 5C shows a perspective view of a cable in an adhesive disposing step of a method of manufacturing a cable according to the first embodiment.

More specifically, the second adhesive 61 is disposed alternately for the six extension parts 301 adjoining in the circumferential direction (refer to FIG. 5A).

Therefore, parts of the second adhesive 61 become disposed between all the adjoining extension parts 301.

This makes it possible to reliably fill the gaps between the extension parts 301 with the second adhesive 61 melted in a heating step described later.

It should be noted that the second adhesive 61 is disposed around the extension parts 301 and in vicinities of the perimeter disposition parts 300 by being inserted from the end portions of the extension parts 301 on a side opposite to the perimeter disposition parts 300.

Here, the second adhesive 61 is formed of the same material as the above-described first adhesive 60.

In the adhesive disposing step, a total of M cylindrical adhesive 61 are disposed for N extension parts 301.

The second adhesive 61 is disposed so as to satisfy a relationship of (N/2)≤M≤N. In the present embodiment, N=6 and M=3.

In this case, as described above, it is possible to dispose the parts of the second adhesive 61 between all adjoining extension parts 301 (refer to FIG. 5A).

[Tube Disposing Step]

Figure 6A:
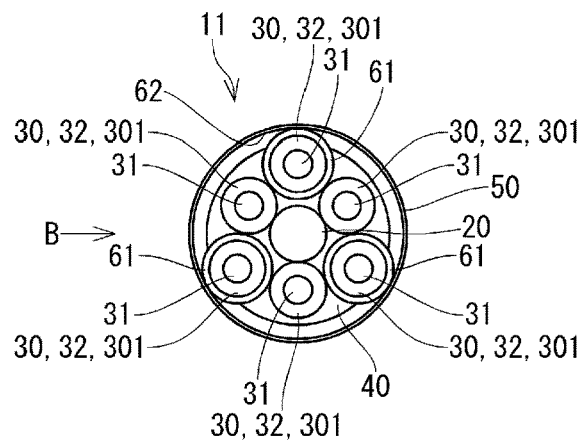
FIG. 6A shows a front view of the cable in the tube disposing step of the method of manufacturing the cable according to the first embodiment.
Figure 6B:
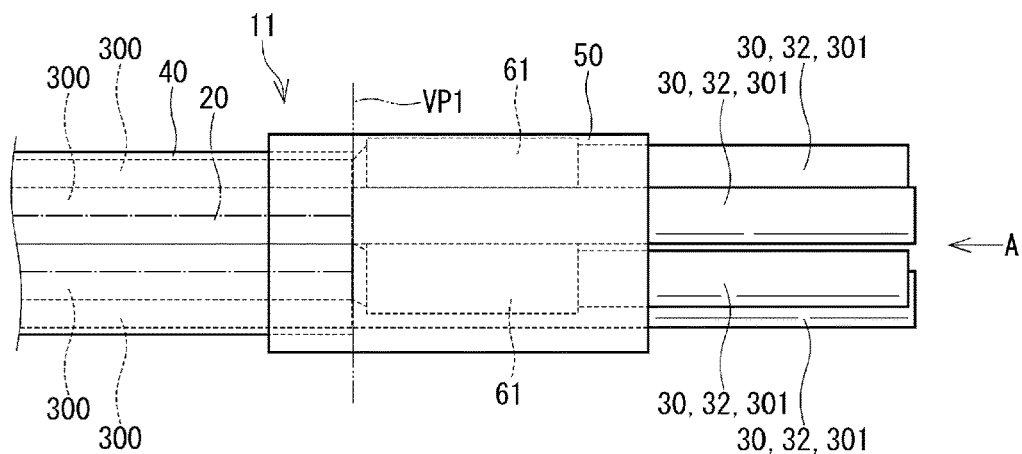
FIG. 6B shows a side view of the cable in the tube disposing step of the method of manufacturing the cable according to the first embodiment in FIG. 6A as seen in the direction of an arrow B.
Figure 6C:
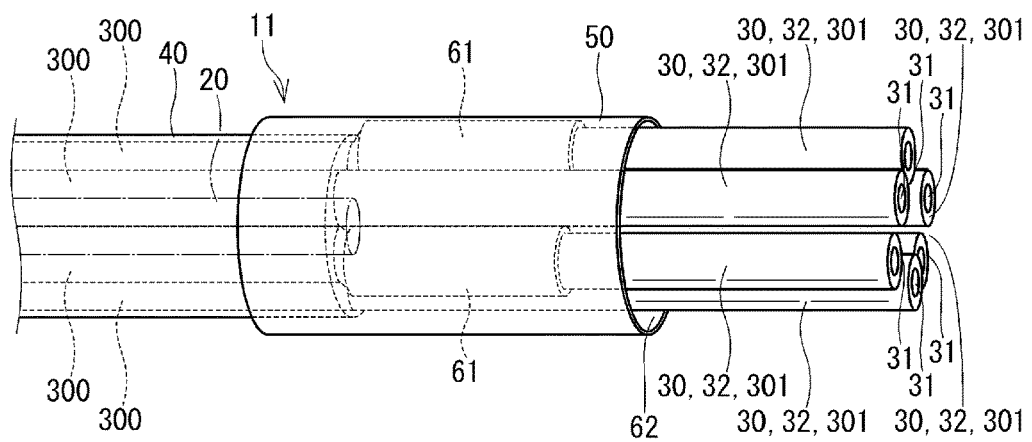
FIG. 6C shows a perspective view of the cable in the tube disposing step of the method of manufacturing the cable according to the first embodiment.

After the adhesive disposing step, the tube 50 is disposed so as to surround the end portion of the sheath 40, the extension parts 301, and the second adhesive 61 in a tube disposing step (refer to FIGS. 6A to 6C).

A third adhesive 62 is disposed on an inner wall of the tube 50 in the present embodiment.

Here, the third adhesive 62 is formed of the same material as the above-described first and second adhesive 60 and 61.

[Heating Step]

After the tube disposing step, the tube 50 and the second and third adhesive 61, 62 are heated by a heating device (not shown) in the heating step.

When the heating temperature at this time is Th, then Ts<Th<Tm2.

As a result, the second and third adhesive 61, 62 are melted and fused to form the first adhesive 60, and the tube 50 shrinks. As the tube 50 shrinks, an inner diameter and a axial length thereof become smaller.

Since the perimeter disposition parts 300 of the conductive wires 30 are disposed around the center member 20 in the present embodiment, the extension parts 301 extending from the perimeter disposition parts 300 are suppressed from being urged toward to specific locations inside the tube 50 during manufacturing the cable 10 such as when the tube 50 is shrinking. As a result, gaps between of the plurality of extension parts 301 become uniform.

Therefore, the melted first adhesive 60 can be sufficiently filled in the gaps between the extension parts 301 inside the tube 50.

As a result, the first adhesive 60 and the inner wall of the tube 50, the outer peripheral walls of the extension parts 301 of the conductive wires 30 and the end surface of the sheath 40 are brought into close contact.

After the heating step, when the ambient temperature reaches the room temperature, the first adhesive 60 cools and solidifies, and the manufacturing of the cable 10 is completed (refer to FIGS. 2A to 2C).

As described above, the cable 10 according to the present embodiment includes the center member 20, the conductive wire 30, the sheath 40, the tube 50, and the first adhesive 60.

The conductive wire 30 has the perimeter disposition part 300 disposed around the center member 20, and an extension part 301 integrally formed with the perimeter disposition part 300 so as to extend from the perimeter disposition part 300. The plurality of conductive wires 30 are disposed.

The sheath 40 is disposed so as to cover the center member 20 and the perimeter disposition parts 300.

The tube 50 is disposed so as to surround the end portion of the sheath 40 and the parts of the extension parts 301, and is shrinkable by heat.

The first adhesive 60 is disposed inside the tube 50 and is melted or softened by heat.

The perimeter disposition parts 300 of the conductive wires 30 are disposed around the center member 20 in the present embodiment.

Therefore, the extension parts 301 extending from the perimeter disposition parts 300 are suppressed from being urged toward to the specific positions inside the tube 50 during manufacturing of the cable 10 such as when the tube 50 is shrunk. As a result, the gaps between the plurality of extension parts 301 become uniform.

Therefore, the first adhesive 60 can be sufficiently filled in the gaps between the extension parts 301 of the conductive wires 30 inside the tube 50.

Therefore, the water resistance at end portions of the cable 10 can be improved.

Further, it is unnecessary to press the tube 50 radially inward as in the prior art when manufacturing the cable 10 in the present embodiment. Therefore, it is unnecessary to provide a device or the like for pressurizing, and the manufacturing cost can be reduced.

In the present embodiment, the center member 20 has the higher melting point than that of the first adhesive 60.

Therefore, it is possible to prevent the center member 20 from melting while melting the first adhesive 60 by setting the heating temperature when manufacturing the cable 10 higher than the melting point of the first adhesive 60 and lower than the melting point of the center member 20.

Thus, it is possible to prevent the center member 20 from deforming when the tube 50 is shrunk by heating, and it is possible to effectively prevent the extension parts 301 from being urged toward to the specific positions inside the tube 50.

Further, each of the conductive wires 30 has the electric conductive member 31 formed of the conductor and the insulating member 32 formed of the insulator that covers the electric conductive member 31 in the present embodiment.

The insulating member 32 has the higher melting point than that of the first adhesive 60.

Therefore, it is possible to prevent the insulating member 32 from melting while melting the first adhesive 60 by setting the heating temperature when manufacturing the cable 10 higher than the melting point of the first adhesive 60 and lower than the melting point of the insulating member 32.

Thus, it is possible to prevent the insulating member 32 from deforming when the tube 50 is shrunk by heating, and it is possible to effectively prevent the extension parts 301 from being urged toward to the specific positions inside the tube 50.

In addition, the shrinkage temperature Ts, which is the temperature at which the tube 50 starts to shrink, is higher than the melting point Tm1 of the first adhesive 60 and is lower than the melting point Tm2 of the center member 20 in the present embodiment.

Therefore, it is possible to prevent the center member 20 from melting while melting the first adhesive 60 and shrinking the tube 50 by setting the heating temperature when manufacturing the cable 10 higher than the shrinkage temperature Ts and lower than the melting point of the center member 20.

Thus, it is possible to prevent the center member 20 from deforming when the tube 50 is shrunk by heating, and it is possible to effectively prevent the extension parts 301 from being urged toward to the specific positions inside the tube 50.

Further, the center member 20 is formed so that the shape of its cross section is circular in the present embodiment. Therefore, the center member 20 can be easily formed.

Further, the perimeter disposition part 300 has the same outer diameter as the outer diameter of the center member 20, and six of them are disposed around the center member 20 in the present embodiment.

Therefore, the outer peripheral wall of each of the six perimeter disposition parts 300 is in contact with the outer peripheral walls of the adjoining perimeter disposition part 300 and the center member 20, and the six perimeter disposition parts 300 are disposed at equal intervals around the center member 20.

Thus, the extension parts 301 are further suppressed from being urged toward to the specific locations inside the tube 50 during manufacturing the cable 10 such as when the tube 50 is shrinking.

In addition, the plurality of perimeter disposition parts 300 are disposed on the virtual circle C1 centered on the center axis Ax1 of the center member 20 in the present embodiment.

Thus, the extension parts 301 are effectively suppressed from being urged toward to the specific locations inside the tube 50 during manufacturing the cable 10 such as when the tube 50 is shrinking.

Further, the electric power steering device 101 of the present embodiment is disposed in the vehicle 1, and includes the cable 10, the motor 2 that outputs the assist torque related to the steering of the vehicle 1, and the control unit 5 electrically connected to the conductive wires 30 of the cable 10 and controls the operation of the motor 2.

Furthermore, the entire part of the control unit 5 is disposed below the upper end part of the silhouette of the wheel 107 of the vehicle 1 in the present embodiment.

Therefore, there is a possibility that the control unit 5 and the ends of the cable 10 may be frequently wetted while the vehicle 1 is travelling.

However, the cable 10 of the present embodiment has high water resistance at the ends thereof.

Therefore, the cable 10 of the present embodiment is suitable for use as a cable of the electric power steering device 101, which may be frequently wetted while the vehicle 1 is travelling.

Further, the method of manufacturing the cable 10 according to the present embodiment includes the sheath removing step, the center member removing step, the adhesive disposing step, the tube disposing step, and the heating step.

Of the sheath 40 covering the plurality of conductive wires 30 of the unprocessed cable 11, which is a cable before processing, the portion corresponding to the extension parts 301 is removed in the sheath removing step.

The portion of the center member 20 corresponding to the extension parts 301 is removed in the center member removing step.

The second adhesive 61 is disposed so that the part of the second adhesive 61 is disposed between the adjoining extension parts 301 in the adhesive disposing step.

The tube 50 is disposed so as to surround the end portion of the sheath 40, the extension parts 301, and the second adhesive 61 in the tube disposing step.

The tube 50 and the second adhesive 61 are heated and the tube 50 is shrunk while melting the second adhesive 61 in the heating step.

Since the second adhesive 61 is disposed so that the part of the second adhesive 61 is disposed between the adjoining extension parts 301 in the adhesive disposing step of the present embodiment, the melted second adhesive 61 in the heating step can be reliably filled in the gaps between the extension parts 301.

Further, since the cable 10 is manufactured by disposing the solid second adhesive 61 in the adhesive disposing step and shrinking the tube 50 while melting the second adhesive 61 in the heating step, the cable 10 can be manufactured easily and efficiently as compared with a method of filling the melted adhesive inside the tube while shrinking the tube, for example.

A total of M cylindrical adhesive 61 are disposed around the extension parts 301 for the N extension parts 301 in the adhesive disposing step of the present embodiment. The second adhesive 61 is disposed so as to satisfy the relationship of (N/2)≤M≤N.

In this case, it is possible to dispose the parts of the second adhesive 61 between all adjoining extension parts 301.

Thereby, the melted second adhesive 61 in the heating step can be reliably filled in the gaps between the extension parts 301. Therefore, it is possible to sufficiently fill the first adhesive 60 inside the tube 50.

Second Embodiment

It should be appreciated that, in a second embodiment and subsequent embodiments, components identical with or similar to those in the first embodiment are given the same reference numerals, unless otherwise indicated, and repeated structures and features thereof will not be described in order to avoid redundant explanation.

Figure 7:
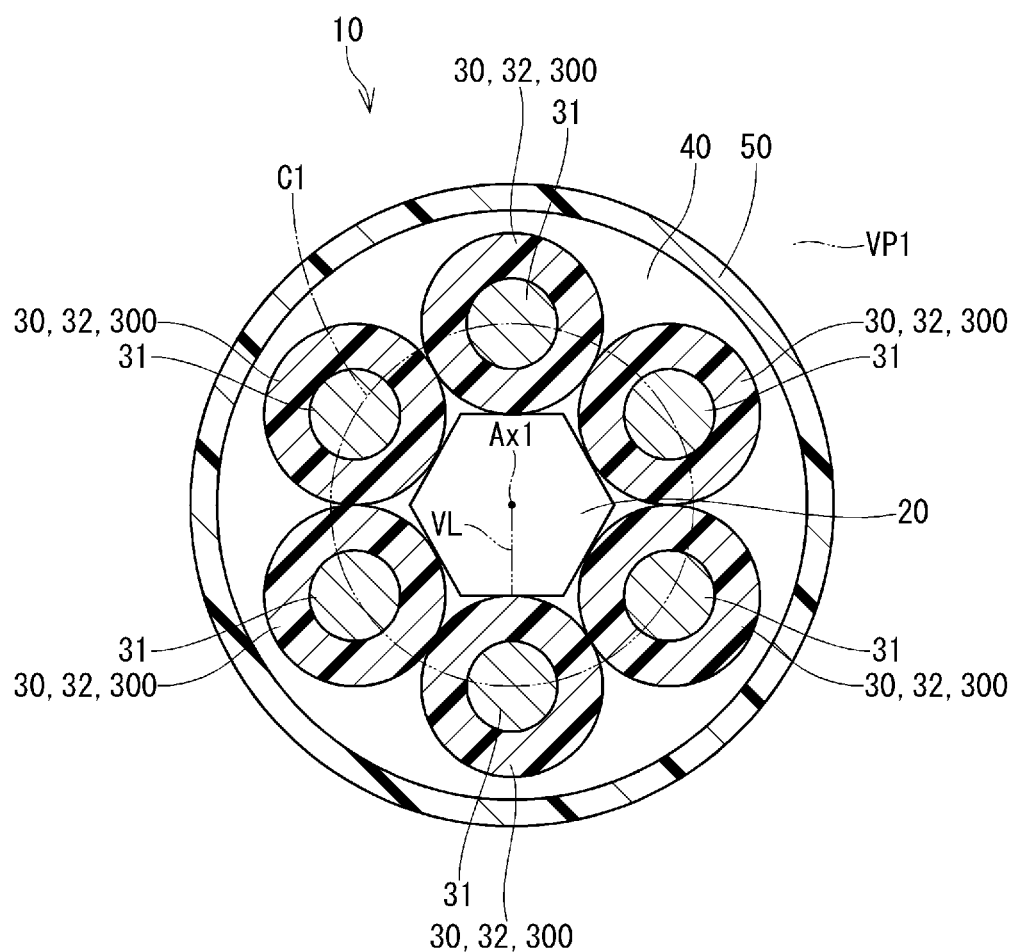
FIG. 7 shows a sectional view of a cable according to a second embodiment.

A part of a cable according to the second embodiment of the present disclosure is shown in FIG. 7.

A shape and the like of a center member 20 are different from those of the first embodiment in the second embodiment.

The center member 20 is formed in a long hexagonal prism shape in the second embodiment. That is, the center member 20 is formed so that a shape of a cross section formed by a virtual plane orthogonal to a center axis Ax1 is hexagonal.

The shape is formed to be a regular hexagon in the present embodiment.

There are six perimeter disposition parts 300 disposed at equal intervals around the center member 20.

The six perimeter disposition parts 300 are disposed on a virtual circle C1 centered on the center axis Ax1 of the center member 20.

More specifically, the perimeter disposition part 300 is disposed such that a center thereof is located on the imaginary circle C1.

Each of the six perimeter disposition parts 300 is disposed so that an outer peripheral wall thereof is in contact with an outer wall of the center member 20 (refer to FIG. 7).

The length of a perpendicular line VL from the center axis Ax1 to each surface (outer wall) of the center member 20 is the same as the radius of the conductive wire 30 in the present embodiment.

That is, the distance between the two parallel surfaces (outer walls) of the center member 20 is the same as the outer diameter of the conductive wire 30.

Therefore, in each of the six perimeter disposition parts 300, the outer peripheral wall is in contact with an outer peripheral wall of the adjoining perimeter disposition part 300 and the outer wall of the center member 20 (refer to FIG. 7).

It should be noted that a corner portion of the center member 20 is disposed so as to correspond to a space between the two adjoining perimeter disposition parts 300.

The second embodiment is the same as the first embodiment except for the points described above.

Therefore, the same effects as those according to the first embodiment can be achieved in the second embodiment with respect to the same configuration as in the first embodiment.

As described above, the center member 20 is formed so that the sectional shape thereof is polygonal in the present embodiment. Further, the center member 20 is formed so that the sectional shape thereof is hexagonal in the present embodiment.

There are six perimeter disposition parts 300 disposed around the center member 20.

Therefore, each of the six perimeter disposition parts 300 can be disposed at equal intervals around the center member 20 so that the outer peripheral wall of the perimeter disposition part 300 comes into contact with the outer peripheral wall of the adjoining perimeter disposition part 300 and the outer wall of the center member 20.

Thus, the extension parts 301 are further suppressed from being urged toward to the specific locations inside the tube 50 during manufacturing the cable 10 such as when the tube 50 is shrinking.

Third Embodiment

Figure 8:
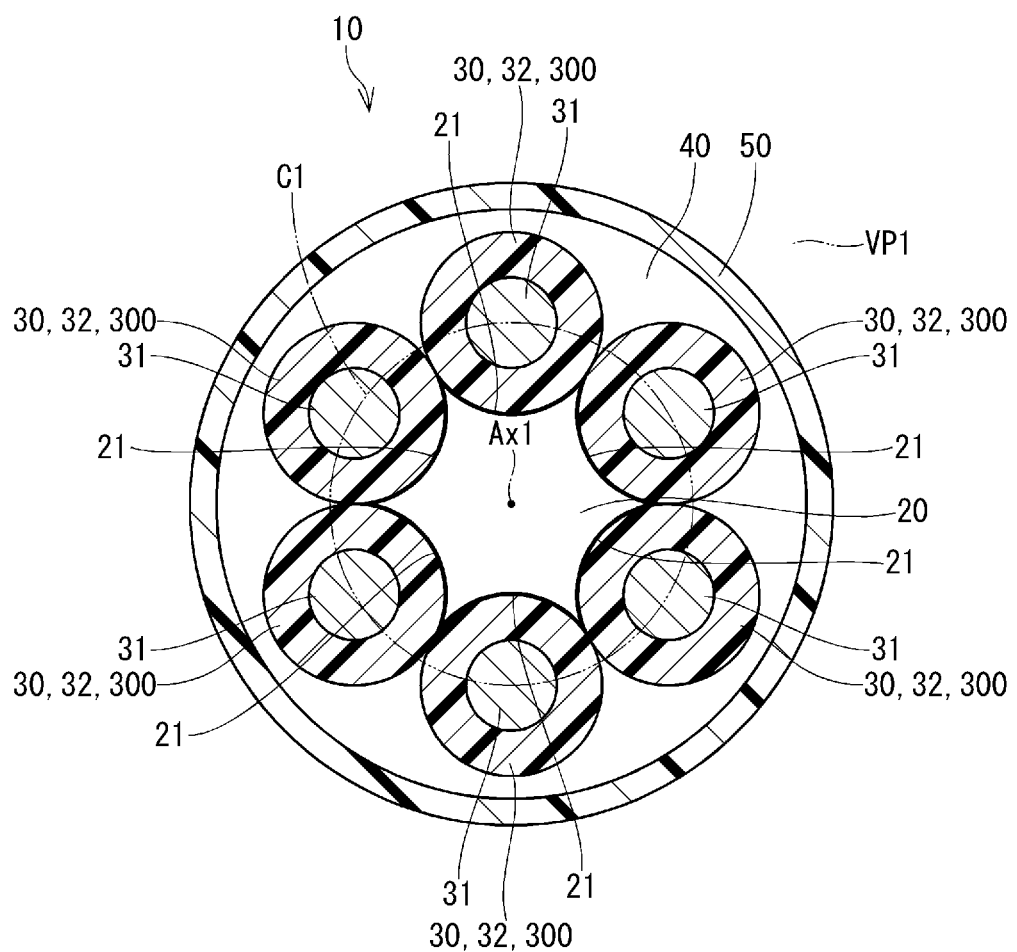
FIG. 8 shows a sectional view of a cable according to a third embodiment.

A part of a cable according to a third embodiment of the present disclosure is shown in FIG. 8. A shape and the like of a center member 20 are different from those of the first embodiment in the third embodiment.

The center member 20 has six recessed portions 21 in the present embodiment.

Each of the recessed portions 21 is recessed toward a center axis Ax1 from an outer wall of the center member 20 and extends in a direction parallel to the central axis Ax1.

The recessed portion 21 is formed so that a sectional shape of a virtual plane orthogonal to the center axis Ax1 is an arc shape corresponding to a part of an outer peripheral wall of a perimeter disposition part 300.

That is, the center member 20 has the recessed portion 21 having a shape corresponding to the outer peripheral wall of the perimeter disposition part 300. There are six recessed portions 21 formed at equal intervals in a circumferential direction of the center member 20.

The six perimeter disposition parts 300 are disposed at equal intervals around the center member 20.

The six perimeter disposition parts 300 are disposed on a virtual circle C1 centered on the center axis Ax1 of the center member 20.

More specifically, the perimeter disposition part 300 is disposed such that a center thereof is located on the imaginary circle C1.

Each of the six perimeter disposition parts 300 is disposed so that an outer peripheral wall thereof is in contact with the recessed portion 21 of the center member 20 (refer to FIG. 8).

The third embodiment is the same as the first embodiment except for the points described above.

Therefore, the same effects as those according to the first embodiment can be achieved in the third embodiment with respect to the same configuration as in the first embodiment.

As described above, the center member 20 has the recessed portions 21 each of which has a shape corresponding to the outer peripheral wall of the perimeter disposition part 300 in the present embodiment.

Therefore, it is possible to stably dispose the perimeter disposition parts 300 around the center member 20 (in the recessed portions 21).

As a result, it is possible to dispose the plurality of perimeter disposition parts 300 at equal intervals around the center member 20.

Thus, the extension parts 301 are further suppressed from being urged toward to the specific locations inside the tube 50 during manufacturing the cable 10 such as when the tube 50 is shrinking.

Fourth Embodiment

Figure 9:
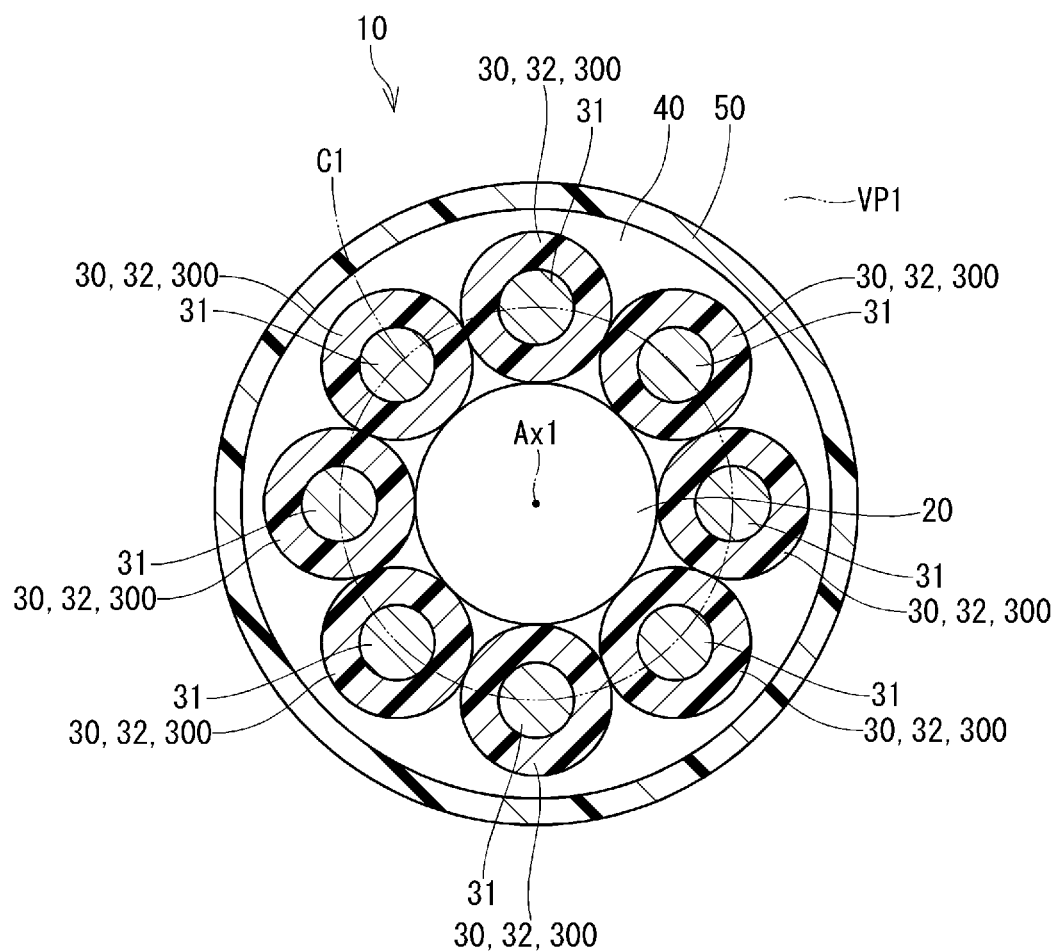
FIG. 9 shows a sectional view of a cable according to a fourth embodiment.

A part of a cable according to a fourth embodiment of the present disclosure is shown in FIG. 9. The fourth embodiment is different from the first embodiment in the number of conductive wires 30 and the like.

A cable 10 has eight conductive wires 30 in the fourth embodiment. An outer diameter of each conductive wire 30 is the same.

Perimeter disposition parts 300 are disposed around a center member 20. More specifically, there are eight perimeter disposition parts 300 disposed at equal intervals around the center member 20.

In the present embodiment, an outer peripheral wall of each of the eight perimeter disposition parts 300 is in contact with outer peripheral walls of the adjoining perimeter disposition part 300 and the center member 20 in the present embodiment (refer to FIG. 9).

In addition, the eight perimeter disposition parts 300 are disposed on a virtual circle C1 centered on a center axis Ax1 of the center member 20.

More specifically, the perimeter disposition part 300 is disposed such that a center thereof is located on the imaginary circle C1 (refer to FIG. 9).

In other words, an outer diameter of the center member 20 is set to such a size that the outer peripheral wall of the center member 20 is in contact with the outer peripheral walls of the eight perimeter disposition parts 300 disposed at equal intervals on the imaginary circle C1.

Therefore, the outer diameter of the center member 20 is larger than the outer diameter of the conductive wire 30.

The fourth embodiment is the same as the first embodiment except for the points described above.

Therefore, the same effects as those according to the first embodiment can be achieved in the fourth embodiment with respect to the same configuration as in the first embodiment.

Fifth Embodiment

Figure 10:
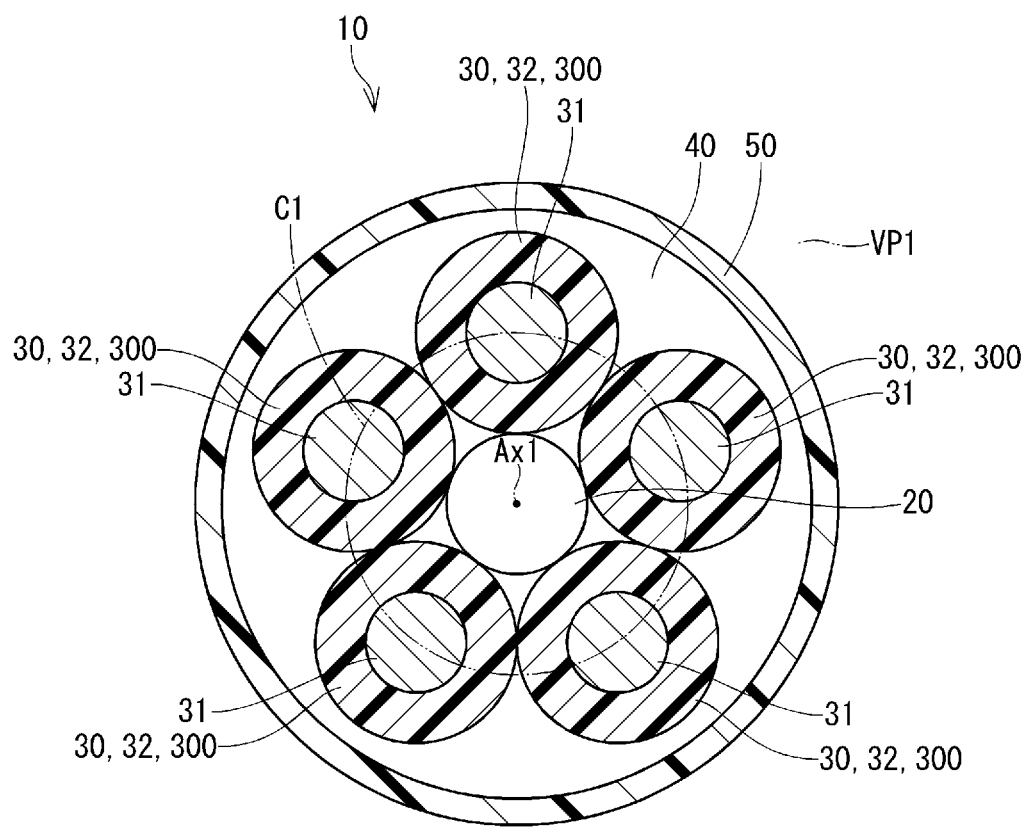
FIG. 10 shows a sectional view of a cable according to a fifth embodiment.

A part of a cable according to a fifth embodiment of the present disclosure is shown in FIG. 10. The fifth embodiment is different from the first embodiment in the number of conductive wires 30 and the like.

A cable 10 has five conductive wires 30 in the fifth embodiment. An outer diameter of each conductive wire 30 is the same.

Perimeter disposition parts 300 are disposed around a center member 20.

More specifically, there are five perimeter disposition parts 300 disposed at equal intervals around the center member 20.

In the present embodiment, an outer peripheral wall of each of the five perimeter disposition parts 300 is in contact with outer peripheral walls of the adjoining perimeter disposition part 300 and the center member 20 in the present embodiment (refer to FIG. 10).

In addition, the five perimeter disposition parts 300 are disposed on a virtual circle C1 centered on a center axis Ax1 of the center member 20.

More specifically, the perimeter disposition part 300 is disposed such that a center thereof is located on the imaginary circle C1 (refer to FIG. 10).

In other words, an outer diameter of the center member 20 is set to such a size that the outer peripheral wall of the center member 20 is in contact with the outer peripheral walls of the five perimeter disposition parts 300 disposed at equal intervals on the imaginary circle C1. Therefore, the outer diameter of the center member 20 is smaller than the outer diameter of the conductive wire 30.

The fifth embodiment is the same as the first embodiment except for the points described above.

Therefore, the same effects as those according to the first embodiment can be achieved in the fifth embodiment with respect to the same configuration as in the first embodiment.

Sixth Embodiment

A cable according to a sixth embodiment of the present disclosure will be described with reference to FIG. 11. The sixth embodiment is different from the first embodiment in part of a method of manufacturing a cable 10.

An adhesive disposing step in the method of manufacturing the cable 10 in the sixth embodiment is as follows.

[Adhesive Disposing Step]

Figure 11:
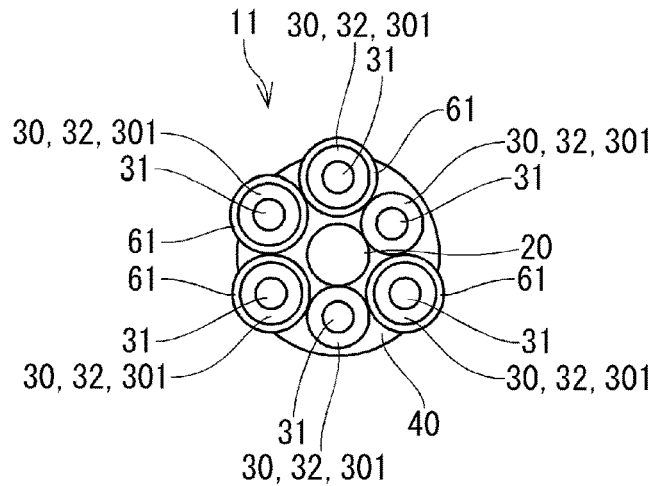
FIG. 11 shows a front view of a cable in an adhesive disposing step of a method of manufacturing a cable according to a sixth embodiment.

After the center member removing step, a substantially cylindrical second adhesive 61 is disposed around four out of the six extension parts 301 in the adhesive disposing step (refer to FIG. 11).

The second adhesive 61 is disposed so as to satisfy the relationship of (N/2)≤M≤N in the adhesive disposing step of the present embodiment. In the present embodiment, N=6 and M=4.

The sixth embodiment is the same as the first embodiment except for the points described above. Therefore, the same effects as those according to the first embodiment can be achieved in the sixth embodiment with respect to the same configuration as in the first embodiment.

Seventh Embodiment

A cable according to a seventh embodiment of the present disclosure will be described with reference to FIG. 11. The seventh embodiment is different from the first embodiment in part of a method of manufacturing a cable 10.

An adhesive disposing step in the method of manufacturing the cable 10 in the seventh embodiment is as follows.

[Adhesive Disposing Step)

Figure 12:
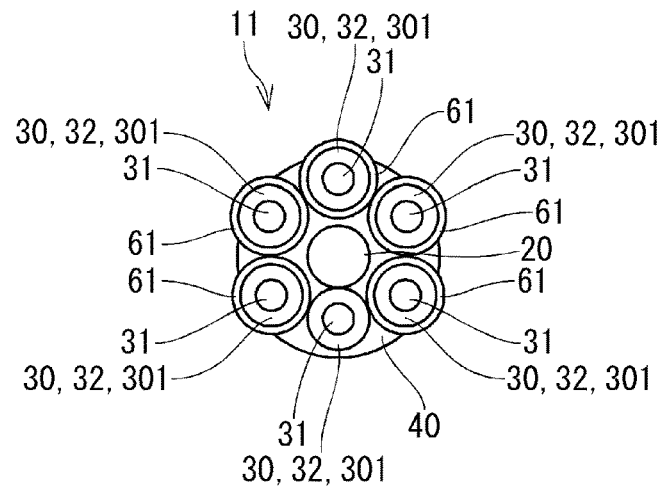
FIG. 12 shows a front view of a cable in an adhesive disposing step of a method of manufacturing a cable according to a seventh embodiment.

After the center member removing step, a substantially cylindrical second adhesive 61 is disposed around five out of the six extension parts 301 in the adhesive disposing step (refer to FIG. 12).

The second adhesive 61 is disposed so as to satisfy the relationship of (N/2)≤M≤N in the adhesive disposing step of the present embodiment. In the present embodiment, N=6 and M=5.

The seventh embodiment is the same as the first embodiment except for the points described above.

Therefore, the same effects as those according to the first embodiment can be achieved in the seventh embodiment with respect to the same configuration as in the first embodiment.

Eighth Embodiment

A cable according to an eighth embodiment of the present disclosure will be described with reference to FIG. 13. The eighth embodiment is different from the first embodiment in part of a method of manufacturing a cable 10.

An adhesive disposing step in the method of manufacturing the cable 10 in the eighth embodiment is as follows.

[Adhesive Disposing Step]

Figure 13:
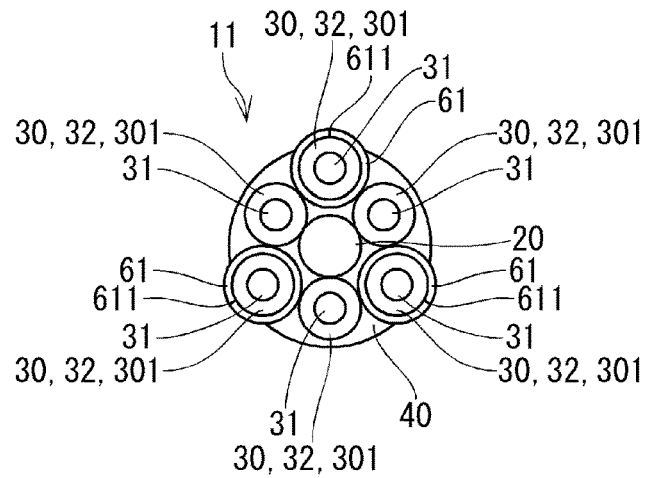
FIG. 13 shows a front view of a cable in an adhesive disposing step of a method of manufacturing a cable according to an eighth embodiment.

After the center member removing step, a substantially cylindrical second adhesive 61 is disposed around three out of the six extension parts 301 in the adhesive disposing step (refer to FIG. 13).

The second adhesive 61 is disposed so as to satisfy the relationship of (N/2)≤M≤N in the adhesive disposing step of the present embodiment. In the present embodiment, N=6 and M=3.

A slit 611 is formed in each of the second adhesive 61 in the present embodiment.

The slit 611 is formed at one position in a circumferential direction of the second adhesive 61 so as to extend from one end to the other end of the second adhesive 61.

Since the slit 611 is formed in the second adhesive 61 of the present embodiment, the second adhesive 61 can be disposed around extension parts 301 by fitting the second adhesive 61 from a radially outer side of the extension part 301 through the slit 611 when disposing the second adhesive 61 around the extension parts 301 in the adhesive disposing step.

Therefore, unlike the first embodiment using the second adhesive 61 having no slit 611, there is no need to insert the second adhesive 61 from the end portion of the extension part 301 on the side opposite to the perimeter disposition part 300.

Therefore, when the length of the extension part 301 is relatively long, the second adhesive 61 can be easily disposed around the extension part 301.

Therefore, the working efficiency in the adhesive disposing step can be improved. The eighth embodiment is the same as the first embodiment except for the points described above.

Therefore, the same effects as those according to the first embodiment can be achieved in the eighth embodiment with respect to the same configuration as in the first embodiment.

Other Embodiments

In another embodiment of the present disclosure, a center member 20 is not limited to a resin as long as it has a predetermined heat resistance, and it may be made of, for example, a metal, rubber, or the like.

In another embodiment of the present disclosure, any number of conductive wires 30 may be disposed as long as there are two or more conductive wires 30.

In another embodiment of the present disclosure, perimeter disposition parts 300 of conductive wires 30 may be disposed at irregular intervals in a circumferential direction of a center member 20.

In another embodiment of the present disclosure, perimeter disposition parts 300 of conductive wires 30 may not be in contact with adjoining perimeter disposition parts 300 as long as outer peripheral walls thereof are in contact with an outer wall of a center member 20.

In another embodiment of the present disclosure, a center member 20 may be formed so that a sectional shape thereof is a polygon other than a hexagon.

In another embodiment of the present disclosure, a third adhesive 62 may not be disposed on an inner wall of a tube 50 disposed in a tube disposing step.

Figure 14A:
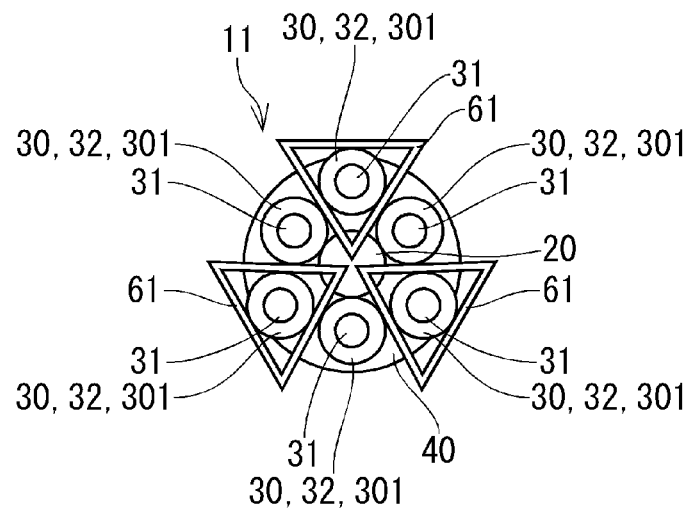
FIG. 14A shows a front view of a cable in an adhesive disposing step of a method of manufacturing a cable according to another embodiment.
Figure 14B:
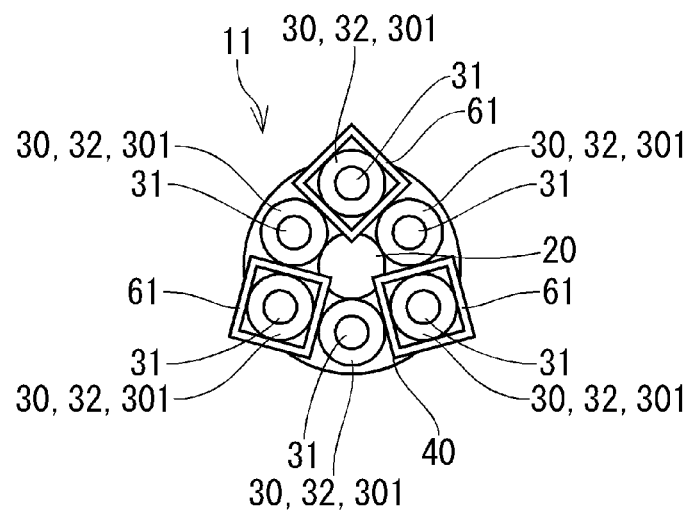
FIG. 14B shows a front view of a cable in an adhesive disposing step of a method of manufacturing a cable according to another embodiment.

In another embodiment of the present disclosure, a second adhesive 61 disposed in an adhesive disposing step is not limited to a substantially cylindrical shape and may be formed in a polygonal tube shape such as a triangular cylinder shape (refer to FIG. 14A), a square tubular shape (refer to FIG. 14B), or the like.

Figure 15A:
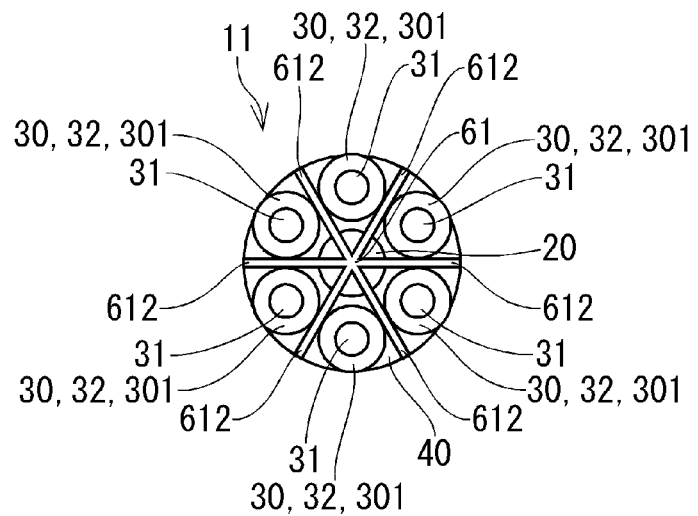
FIG. 15A shows a front view of a cable in an adhesive disposing step of a method of manufacturing a cable according to another embodiment.
Figure 15B:
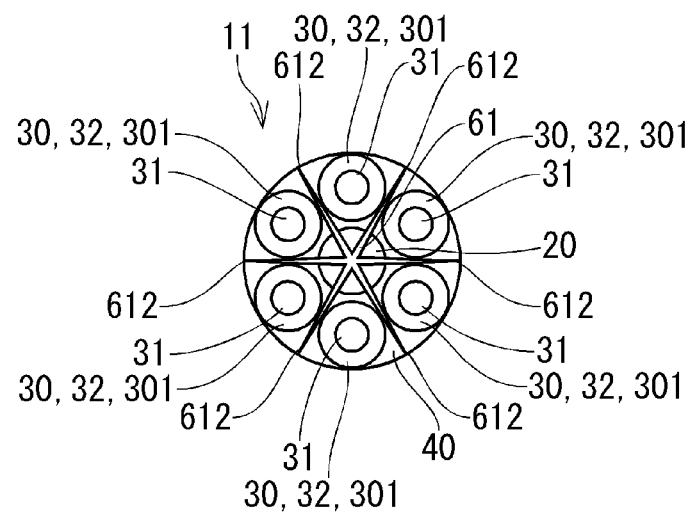
FIG. 15B shows a front view of a cable in an adhesive disposing step of a method of manufacturing a cable according to another embodiment.

In another embodiment of the present disclosure, a second adhesive 61 disposed in an adhesive disposing step is not limited to a cylindrical shape, but may have plate parts 612 extending in a plate shape radially outward from a center so that a sectional shape thereof becomes a star shape (refer to FIGS. 15A and 15B).

In an example shown in FIG. 15A, the plate part 612 is formed so that the plate thickness is the same from the center of the second adhesive 61 toward radially outward.

On the other hand, in an example shown in FIG. 15B, the plate part 612 is formed so that the plate thickness decreases from the center of the second adhesive 61 toward radially outward.

Figure 16A:
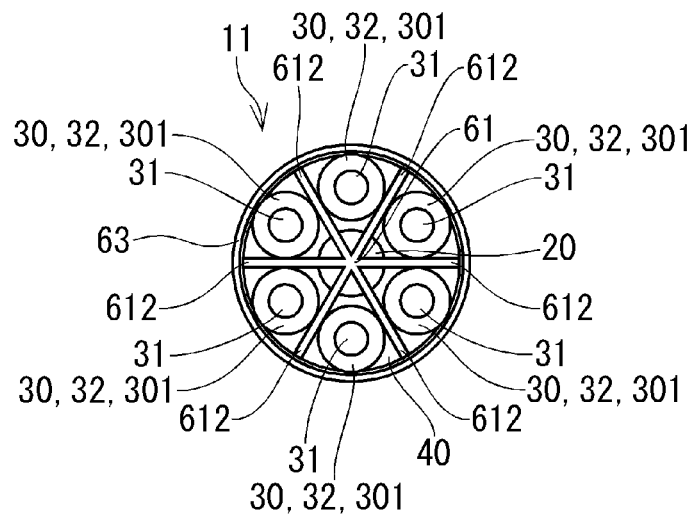
FIG. 16A shows a front view of a cable in an adhesive disposing step of a method of manufacturing a cable according to another embodiment.
Figure 16B:
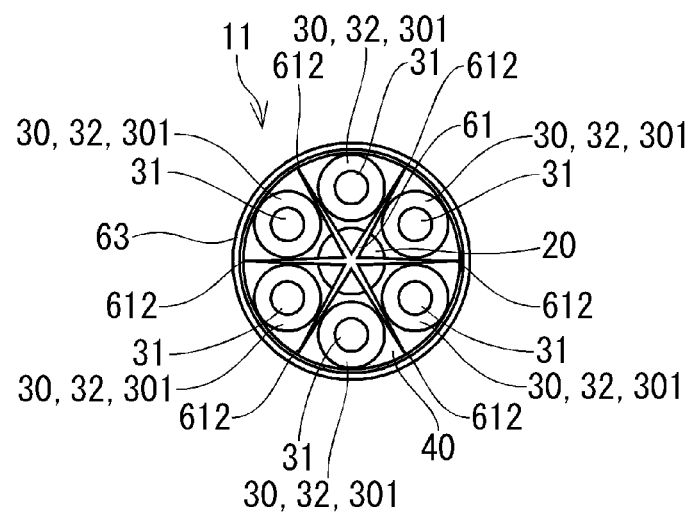
FIG. 16B shows a front view of a cable in an adhesive disposing step of a method of manufacturing a cable according to another embodiment.

In another embodiment of the present disclosure, a tubular adhesive 63 may be further disposed in an adhesive disposing step in addition to a second adhesive 61 (refer to FIGS. 16A and 16B). Here, the tubular adhesive 63 is formed of the same material as the second adhesive 61.

In another embodiment of the present disclosure, the polygonal tubular second adhesive 61 described above may have a slit 611.

Further, the tubular adhesive 63 may have a slit extending from one end to the other end.

As described above, the second adhesive 61 disposed in the adhesive disposing step may have any shape as long as a part thereof is disposed between the adjoining extension parts 301.

The melted second adhesive 61 in the heating step can be reliably filled in gaps between the extension parts 301 by a part of the second adhesive 61 being disposed between the adjoining extension parts 301.

In the cable 10 of the present disclosure, an end portion of an extension part 301 on a side opposite to a perimeter disposition part 300 may be electrically connected directly to a substrate of a control unit 5, or a connector may be disposed at the end portion of the extension part 301 on the side opposite to the perimeter disposition part 300 and the end portion may be electrically connected to the substrate of the control unit 5 via the connector, for example.

In another embodiment of the present disclosure, a control unit 5 may be disposed so as to be positioned above an upper end part of a silhouette of a wheel 107 of a vehicle 1.

Further, the present disclosure is not limited to being connected to a control unit 5 of an electric power steering device 101 disposed in the water environment, and is suitable for use in other equipment or the like disposed in the water environment.

As described above, the present disclosure is not limited to the above-described embodiments, and can be implemented in various forms without departing from the scope thereof.

What is claimed is:

1. A cable comprising:
a center member,
a plurality of conductive wires each of which has a perimeter disposition part disposed around the center member and an extension part integrally formed with the perimeter disposition part so as to extend from the perimeter disposition part,
a sheath that covers the center member and the perimeter disposition part,
a thermally shrinkable tube that surrounds an end portion of the sheath and a part of the extension part, and
an adhesive melted or softened by heat disposed inside the tube.

2. The cable according to claim 1, wherein,
a melting point of the center member is higher than a melting point of the adhesive.

3. The cable according to claim 1, wherein,
the conductive wire includes an electric conductive member formed of a conductor and an insulating member formed of an insulator that covers the electric conductive member, and
a melting point of the insulating member is higher than a melting point of the adhesive.

4. The cable according to claim 1, wherein,
a shrinkage temperature, which is a temperature at which the tube starts to shrink, is higher than a melting point of the adhesive and is lower than a melting point of the center member.

5. The cable according to claim 1, wherein,
the center member is formed to have a circular sectional shape.

6. The cable according to claim 5, wherein,
an outer diameter of the perimeter disposition part and an outer diameter of the center member are the same, and there are six perimeter disposition parts disposed around the center member.

7. The cable according to claim 1, wherein,
the center member is formed to have a polygonal sectional shape.

8. The cable according to claim 7, wherein,
the center member is formed to have a hexagonal sectional shape,
there are six perimeter disposition parts disposed around the center member.

9. The cable according to claim 1, wherein,
the center member has a recessed portion having a shape corresponding to an outer peripheral wall of the perimeter disposition part.

10. The cable according to claim 1, wherein, a plurality of perimeter disposition parts are disposed on a virtual circle centered on a center axis of the center member.

11. An electric power steering device disposed in a vehicle comprising:
a cable according to claim 1,
a motor that outputs an assist torque related to a steering of the vehicle, and
a control unit electrically connected to a conductive wire of the cable and capable of controlling an operation of the motor.

12. The electric power steering device according to claim 11, wherein,
at least a part of the control unit is disposed below an upper end part of a silhouette of a wheel of the vehicle.

13. A method for manufacturing the cable according to claim 1, the method comprising:
a sheath removing step for removing a portion corresponding to the extension part of the sheath covering a plurality of conductive wires of an unprocessed cable, which is a cable before processing,
a center member removing step for removing a portion of the center member corresponding to the extension part,
an adhesive disposing step for disposing the adhesive so that a part of an adhesive is disposed between the adjoining extension parts,
a tube disposing step for disposing the tube so as to surround an end portion of the sheath, the extension part, and the adhesive, and
a heating step for heating the tube and the adhesive to shrink the tube while melting the adhesive.

14. The method for manufacturing a cable according to claim 13, wherein,
a total of M cylindrical adhesive are disposed around the extension parts for the N extension parts in the adhesive disposing step, and
the adhesive is disposed so as to satisfy a relationship of $(N/2) \leq M \leq N$.

* * * * *